United States Patent [19]

Battais

[11] Patent Number: 4,663,095

[45] Date of Patent: May 5, 1987

[54] METHOD OF MAKING A FOAMED INSULATION COAXIAL CABLE FOR HYPERFREQUENCIES TRANSMISSIONS

[75] Inventor: Alain Battais, Montmirail, France

[73] Assignee: Habia Cable SA, France

[21] Appl. No.: 654,309

[22] Filed: Sep. 25, 1984

[30] Foreign Application Priority Data

Sep. 29, 1983 [FR] France ................................ 83 15694

[51] Int. Cl.$^4$ ............................................. B29C 47/02
[52] U.S. Cl. ...................................... 264/45.9; 156/51; 156/244.12; 174/110 F; 174/110 FC; 427/119
[58] Field of Search ............................. 156/51, 244.12; 174/110 F, 110 FC; 264/45.9, 46.1; 427/119

[56] References Cited

U.S. PATENT DOCUMENTS 3,410,932 11/1968 Woodson et al. ............... 427/119 X
3,522,089 7/1970 Takada et al. ...................... 427/119
4,368,350 1/1983 Perelman .................... 174/110 F X
4,529,564 7/1985 Harlow ..................... 174/110 FC X
4,560,829 12/1985 Reed et al. .................. 174/110 F X Primary Examiner—Robert A. Dawson
Attorney, Agent, or Firm—Lerner, David, Littenberg, Krumholz & Mentlik

[57] ABSTRACT

The invention concerns a method for producing a coaxial cable intended for the transmission of very high frequency signals. This coaxial cable comprises a dielectric insulating layer composed of foamed polytetrafluoroethylene or a composition comprising at least 80% of this product named hereinafter COMPOUND. The layer of insulating material is directly obtained by cold extrusion of a COMPOUND powder, the intimate mixing of a pore-forming agent and a foaming agent and a lubricating oil. The mixing of the COMPOUND powder, the pore-forming and foaming agents is effected dry or in aqueous dispersion. Principal application: Fields of use of ultra-high frequencies such as radars and transmissions.

16 Claims, No Drawings

METHOD OF MAKING A FOAMED INSULATION COAXIAL CABLE FOR HYPERFREQUENCIES TRANSMISSIONS

The present invention relates to a coaxial cable intended for the transmission of very high frequency signals.

Signal propagation is ordered by electromagnetic rules which take into account in particular the frequency, the geometric appearance and the characteristics of the substance crossed, and the temperature.

Some transmission and detection systems require, notably for better performances, the use of very high frequency signals of which the attenuation is all the greater as the frequency is high.

Now, if it is considered that it is generally impossible to act on the temperature, it is consequently possible to intervene only on the physical and geometrical characteristics of the substance crossed, the most important of which is the dielectric constant of the insulation substance layer located between the central conductor and the shielding.

Different solutions, intended to decrease the value of the dielectric constant of the insulating substance layer located between the central conductor and the shielding, in order to bring it closer to that of the air ($\epsilon = 1$), have been considered. These solutions consist, mostly, in using a foamed material, in order to reduce the quantity of the basic insulating material per unit of volume, and to obtain a dielectric constant as near as possible to that of the gas confined in the cells of the foamed material.

Among these solutions, we can mention those described in French Patents:

FR-A-2 214 162, which describes a process for the production of wires and cables insulated with considerably expanded polyolefins. This process consists in mixing a polyolefin, a nucleation agent and a volatile agent in an extruder, with a view to covering, hot, the surface of the central conductor with a considerably expanded polyolefin foam layer (degree of expansion: 60%).

FR-A-2 240 507, which describes a coaxial cable and its process of production, which consists in using a dielectric in expanded ethylene of polypropylene polymer whose coating on the central conductor is made by extrusion with expansion by a swelling agent injected into the composition before extrusion.

Three solutions are at present used industrially in order to obtain an insulating material with low dielectric constant:

Extruded cellular polyethylene, whose dielectric constant is about 1.55, but whose poor temperature behaviour limits its use to a temperate environment. Further, its attenuation limits its use to frequencies lower than 1 GHZ.

Extruded foamed fluoroethylene-propylene (F.E.P.) whose dielectric constant is about 1.4 and service temperature is higher than that of the extruded cellular polyethylene, but whose attention limits its use to frequencies lower than 800 MHz.

Taped polytetrafluoroethylene (P.T.F.E.) whose dielectric constant is about 1.4, which offers characteristics adapted for the transmission of signals whose frequency can reach 10 GHz, but which necesitates a previous shaping and a delicate positioning by wrapping, which at present limit the lengths that can be used.

The coaxial cable of this invention intends to overcome the disadvantages shown by the solutions used at present, by making an insulating layer with a low dielectric constant, obtained in a continuous and homogeneous manner, and employing a conventional cold extrusion process.

The products and the process used make it possible to obtain a coaxial cable whose geometrical, electrical and thermal characteristics are superior to those of all the existing cables without limit due to manufacturing techniques, as is presently the case with the taped process, using production means very close to the conventional means used up to now in this type of manufacture.

This coaxial cable, whose insulating dielectric layer is composed of expanded polytetrafluoroethylene or of a composition comprising at least 80% of this product, named hereinafter COMPOUND, is mainly characterized in that this insulating layer is obtained directly by cold extrusion of a COMPOUND powder, an intimate mixture of a pore-forming agent and a foaming agent and a lubricating oil.

The COMPOUND powder has a granulometry lower than 500 microns, and preferably between 300 and 400 microns.

The pore-forming agent belongs to the aromatic series and may be composed of a compound such as benzene, toluene, naphthalene, benzaldehyde, aniline or one of their mono- or polyhalogenated derivatives or mixtures thereof and whose melting point is preferably comprised between 50° and 100° C. and boiling point is below 300° C. This pore-forming agent is preferably chosen among products which have a tendency to sublimate.

According to the nature of the pore-forming agent, it may be necessary to use a foaming agent.

The foaming agent is activated or non-activated azodicarbonamide, modified azodicarbonamide, 5 phenyl tetrazol and its derivatives, or an aromatic derivative of hydrazines, whose decomposition point is between 200° and 390° C.

The pore-forming agent and the foaming agent have a granulometry lower than 200 microns and preferably between 50 and 100 microns.

The lubricating oil is constituted by a mixture of aliphatic hydrocarbons whose evaporation temperature is lower than the sublimation or the decomposition temperature of the pore-forming and foaming agents.

The proportions used are from 30 to 85% for the COMPOUND, 10 to 50% for the intimate mixture of pore-forming and foaming agents and 5 to 20% for the lubricating oil.

According to a first process, the mixture of the components is made by a dry procedure.

According to a second, preferred process, the mixture is obtained by separate dispersion in a liquid of, on the one hand, the COMPOUND powder, and, on the other hand, the pore-forming and foaming agents. This operation is followed by a mixture of the whole and evaporation of the liquid. The powder obtained is lubricated with lubricating oil with a view to cold extrusion thereof directly around the central conductor. Extrusion is followed by evaporation and sintering.

Other characteristics and advantages will appear from the following description of a coaxial cable made according to the invention in accordance with the aqueous process.

The aqueous dispersion process makes it possible to obtain grains whose dimensions are much lower than those obtained by dry mixing, and to increase the homogeneity and regularity of the insulating layer which presents porosities of the order of one micron.

The principle consists in mixing with the COMPOUND powder, a product which sublimates or decomposes before or during the sintering, and which constitutes an unoccupied space whose volume is equal to or higher than that of the grain used.

Sublimation or decomposition temperature of the foaming agent must be higher than that of the lubricating oil, so that the COMPOUND is already agglomerated during sublimation or decomposition.

The mode of extrusion for the COMPOUND is a conventional one with, however, the necessity of using special equipment.

The sintering, because of the addition of a sublimating or decomposing product, must be made in three different zones, in a special oven in order to obtain successively: evaporation of the oils, sublimation or decomposition of the expansion product, then sintering of the COMPOUND.

The result obtained by using the expanded COMPOUND for making this coaxial cable makes it possible to obtain without major difficulty a dielectric constant 1.3.

The coaxial cable according to the invention is mainly intended for the fields of use of ultra high frequencies such as radar, electronics and transmissions. Its flexibility is an advantage over rigid wave guides.

I claim:

1. A method for producing a coaxial cable comprising a central conductor and a dielectric insulating layer which comprises preparing polytetrafluoroethylene powder composition in admixture with a pore-forming agent, cold extruding said mixture onto said central conductor so as to form said dielectric insulating layer thereon, said dielectric insulating layer comprising at least about 80% of said polytetrafluoroethylene, and expanding said dielectric insulating layer by sublimation of said pore-forming agent, whereby said dielectric insulating layer has a dielectric constant no greater than about 1.3.

2. The method of claim 1 wherein said polytetrafluoroethylene powder composition is in intimate mixture with said pre-forming agent and a framing agent.

3. The method of claim 2 wherein said polytetrafluoroethylene powder composition includes a lubricating oil.

4. The method of claim 1 wherein said polytetrafluoroethylene powder composition has a granulometry of lower than about 500 microns.

5. The method of claim 4 wherein said polytetrafluoroethylene powder composition has a granulometry of between about 300 and 400 microns.

6. The method of claim 1 wherein said pore-forming agent is selected from the group consisting of benzene, toluene, naphthalene, benzaldehyde, aniline or one of the mono- or polyhalogenated derivatives thereof, and mixtures thereof.

7. The method of claim 2 wherein said foaming agent is selected from the group consisting of activated and non-activated azodicarbonamide, modified azodicarbonamide, 5 phenyl tetrazol and its derivatives, the aromatic derivatives of the hydrazines, and mixtures thereof.

8. The method of claim 2 wherein said foaming agent has a decomposition point of between about 200° and 390° C.

9. The method of claim 2 wherein said intimate mixture of said pore-forming agent and said foaming agent has a granulometry of less than about 200 microns.

10. The method of claim 9 wherein said intimate mixture of said pore-forming agent and said foaming agent has a granulometry of between about 50 and 100 microns.

11. The method of claim 3 wherein said lubricating oil has an evaporating temperature which is less than the sublimation temperature or the decomposition temperature of either of said pore-forming agent or said foaming agent.

12. The method of claim 2 wherein said step of preparing said expanded polytetrafluoroethylene comprises dry mixing said polytetrafluoroethylene powder, said pre-forming agent, and said foaming agent.

13. The method of claim 2 wherein said step of preparing said expanded polytetrafluoroethylene composition comprises preparing an acqueous dispersion of said polytetrafluoroethylene powder, said pore-forming agent and said foaming agent.

14. The method of claim 2 wherein said step of preparing said expanded polytetrafluoroethylene composition comprises dispersing said polytetrafluoroethylene powder in a first liquid, dispersing said pore forming agent and said foaming agent in a second liquid, mixing said first and second liquid mixtures, and evaporating said first and second liquids.

15. The method of claim 14 wherein said first and second liquids comprises the same liquid.

16. The method of claim 14 including the steps of lubricating said evaporated mixture by adding a lubricating oil thereto prior to said cold extruding step, and subsequently evaporating and sintering said extruded layer of expanded polytetrafluoroethylene.

* * * * *

UNITED STATES PATENT AND TRADEMARK OFFICE
CERTIFICATE OF CORRECTION

PATENT NO. : 4,663,095

DATED : May 5, 1987

INVENTOR(S) : Alain Battais

Page 1 of 5

It is certified that error appears in the above-identified patent and that said Letters Patent is hereby corrected as shown below:

The title page and columns 1-5 should be deleted to appear as per attached sheets.

Signed and Sealed this

Nineteenth Day of April, 1988

Attest:

DONALD J. QUIGG

*Attesting Officer*    *Commissioner of Patents and Trademarks*

United States Patent [19]

Battais

[11] Patent Number: 4,663,095

[45] Date of Patent: May 5, 1987

[54] METHOD OF MAKING A FOAMED INSULATION COAXIAL CABLE FOR HYPERFREQUENCIES TRANSMISSIONS

[75] Inventor: Alain Battais, Montmirail, France

[73] Assignee: Habia Cable SA, France

[21] Appl. No.: 654,309

[22] Filed: Sep. 25, 1984

[30] Foreign Application Priority Data

Sep. 29, 1983 [FR] France ............................. 83 15694

[51] Int. Cl.[4] .............................................. B29C 47/02
[52] U.S. Cl. ..................................... 264/45.9; 156/51;
156/244.12; 174/110 F; 174/110 FC; 427/119
[58] Field of Search ............................. 156/51, 244.12;
174/110 F, 110 FC; 264/45.9, 46.1; 427/119

[56] References Cited

U.S. PATENT DOCUMENTS

| | | | |
|---|---|---|---|
| 3,410,932 | 11/1968 | Woodson et al. | 427/119 X |
| 3,522,089 | 7/1970 | Takada et al. | 427/119 |
| 4,368,350 | 1/1983 | Perelman | 174/110 F X |
| 4,529,564 | 7/1985 | Harlow | 174/110 FC X |
| 4,560,829 | 12/1985 | Reed et al. | 174/110 F X |

Primary Examiner—Robert A. Dawson
Attorney, Agent, or Firm—Lerner, David, Littenberg, Krumholz & Mentlik

[57] ABSTRACT

Coaxial cables for the transmission of very high frequency signals are disclosed including a dielectric insulating layer primarily comprising expanded polytetrafluoroethylene in the form a continuous and substantially homogeneous layer, preferably having a dielectric constant no greater than about 1.3. Methods for producing these coaxial cables are also disclosed, including the cold extrusion of a layer of expanded polytetrafluoroethylene onto a central conductor, in which the extrudate is preferably formed from a mixture of the polytetrafluoroethylene, an intimate mixture of a pore-forming agent and a foaming agent, and a lubricating oil. Methods for such preparation are disclosed in both a dry mixture and an aqueous dispersion.

16 Claims, No Drawings

METHOD OF MAKING A FOAMED INSULATION COAXIAL CABLE FOR HYPERFREQUENCIES TRANSMISSIONS

FIELD OF THE INVENTION

The present invention relates to coaxial cables, and more particularly to coaxial cables intended for the transmission of very high frequency signals. More particularly, the present invention relates to coaxial cables including a dielectric insulating layer having a low dielectric constant. Still more particularly, the present invention relates to methods for producing coaxial cables for the transmission of very high frequency signals, including extruding a dielectric insulating layer onto a central conductor.

BACKGROUND OF THE INVENTION

The propagation of signals through various conductors is governed by electromagnetic rules which particularly take into consideration the frequency, the geometric appearance and characteristics of the substances through which the signals pass, and the temperature.

Particularly in order to obtain better performance, many transmission detection systems require the use of very high frequency signals, with respect to which, however, the attenuation is that much greater as the signal frequency is increased. Since it is considered to be generally impossible to act upon the temperature, it is therefore only possible to attempt to alter the physical and geometrical characteristics of the material through which the signal will pass, and the most significant of these properties is the dielectric constant of the layer of insulation material located between the central conductor and the outer shielding.

Various solutions have thus been considered in attempting to decrease the value of the dielectric constant of this insulating layer located between the central conductor and the shielding in order to attempt to bring that dielectric constant closer to that of air ($\epsilon=1$). These solutions primarily consist of using a foamed material in order to reduce the quantity of the basic insulating material per unit of volume, and to thus obtain a dielectric constant as near as possible to that of the gas confined in the cells of the foamed material. In particular, reference in this regard is made to French Patent No. 2214162, in which a process for the production of wires and cables insulated with considerably expanded polyolefins is described. The process shown in this patent consists of mixing polyolefin, a nucleation agent, and a volatile agent in an extruder, with the intention of covering the surface of the central conductor with a hot considerably expanded polyolefin foam layer with a degree of expansion of approximately 60%. Also, in French Patent No. 2240507, a process is described for the production of a coaxial cable in which as a dielectric there is utilized an expanded ethylene or polypropylene polymer which is coated onto the central conductor by way of extrusion with expansion by a swelling agent injected into the composition before the extrusion step. Furthermore, British Patent No. 2,070,617 discloses the use of a foamed dielectric for coaxial cables which primarily employs a melt extrudable perfluorocarbon resin, such as copolymers of tetrafluoroethylene and hexafluoropropylene, as well as minor amounts of a polytetrafluoroethylene nucleating agent and a volatile blowing agent.

At present, on an industrial scale, there are three different general solutions which have been utilized in order to obtain insulating materials with low dielectric constants. These include: (1) the use of extruded cellular polyethylene, having a dielectric constant of about 1.55, but having poor temperature behaviour, which limits its use to particular temperature environment; also the attenuation of this material limits its use to frequencies lower than about 1 GHz; (2) the use of extruded foamed fluoroethylene-propylene (F.E.P.—see aforementioned British Patent No. 2070617) which has a dielectric constant of about 1.4, and whose surface temperature is higher than that of the extruded cellular polyethylene, but whose attenuation again limits its use to frequencies lower than about 800 MHz; and (3) the use of taped polytetrafluoroethylene (P.T.F.E.) which also has a dielectric constant of about 1.4, and which offers characteristics which are adapted for the transmission of signals whose frequency can reach about 10 GHz, but which necessitates a previous shaping and a delicate positioning by means of wrapping which thus presently limits the length of this material that can be utilized.

SUMMARY OF THE INVENTION

In accordance with the present invention, these and other disadvantages have now been overcome by the discovery of an insulating layer for use with these coaxial cables which has a low dielectric constant, which is obtained in a continuous and homogeneous manner, and which employs a conventional cold extrusion process.

In accordance with this invention, applicant has discovered a coaxial cable including a conductor, a dielectric insulating layer, and an outer shielding layer, in which the dielectric insulating layer primarily comprises expanded polytetrafluoroethylene in the form of a continuous and substantially homogeneous layer. Preferably, the coaxial cable has a dielectric constant no greater than about 1.3, and in a preferred embodiment at least about 80% of the foamed layer comprising the dielectric insulating layer comprises polytetrafluoroethylene.

In accordance with the method of the present invention, methods for producing coaxial cables have been discovered which include cold extruding a layer of expanded polytetrafluoroethylene onto a central conductor in order to form a dielectric insulating layer thereon, and preferably the method includes cold extruding a layer which comprises at least about 80% expanded polytetrafluoroethylene.

In accordance with one embodiment of the method of the present invention, the expanded polytetrafluoroethylene layer is prepared from a polytetrafluoroethylene (P.T.F.E.) powder composition prior to the cold extruding step. Preferably, the P.T.F.E. powder comprises powdered P.T.F.E. in combination with a pore-forming agent.

In accordance with another embodiment of the method of the present invention, the P.T.F.E. powder comprises powdered P.T.F.E. in combination with an intimate mixture of a pore-forming agent and a foaming agent. In a preferred embodiment, the P.T.F.E. powder composition includes a lubricating oil.

In accordance with another embodiment of the method of the present invention, the P.T.F.E. powder composition has a granulometry lower than about 500 microns, and preferably between about 300 and 400 microns.

In accordance with a preferred embodiment of the method of the present invention, the pore-forming agent is sublimable, and preferably has a melting point of between about 50 and 100° C., and a boiling point of less than about 300° C. In addition, when foaming agents are employed, they preferably have decomposition points of between about 200 and 390° C.

In accordance with one embodiment of the method of the present invention, the step of preparing the expanded P.T.F.E. comprises dry mixing the P.T.F.E. powder, a pore-forming agent, and a foaming agent.

In accordance with another embodiment of the method of the present invention, the step of preparing the expanded P.T.F.E. comprises preparing an aqueous dispersion of the P.T.F.E. powder, the pore-forming agent and the foaming agent. In a preferred method, the P.T.F.E. powder is dispersed in a first liquid, the pore-forming and foaming agents are dispersed in a second liquid, the first and second liquids preferably comprising the same material, and these two liquid compositions are then mixed together, and the first and second liquids are then evaporated therefrom. Preferably, this method includes lubricating the evaporated mixture by adding a lubricating oil thereto prior to the cold extruding step, and subsequently evaporating and sintering the extruded layer of expanded P.T.F.E.

The present product and process thus now make it possible to obtain coaxial cables which have geometrical, electrical and thermal characteristics which are superior to those of existing cables, and which are not limited due to the manufacturing techniques required, which is presently the case with, for example, the taped process (3) mentioned above. Furthermore, the present invention utilizes production techniques which are very close to the conventional techniques used in this type of manufacture.

DETAILED DESCRIPTION

The coaxial cable of this invention, whose insulating dielectric layer is composed of expanded polytetrafluoroethylene or an expanded composition comprising at least about 80% P.T.F.E., is primarily characterized in that the insulating layer is obtained directly by cold extrusion of a powder of this expandable material, preferably along with an intimate mixture of a pore-forming agent and a foaming agent, along with a lubricating oil. The expandable powder composition preferably has a granulometry lower than about 500 microns and preferably of between about 300 and 400 microns.

The pore-forming agents utilized in accordance with this invention generally belong to the aromatic series, and in particular they include compounds such as benzene, toluene, naphthalene, benzaldehyde, aniline, or one of their mono- or polyhalogenated derivatives, or mixtures thereof, and having a melting point preferably between about 50 and 100° C., and a boiling point of below about 300° C. The pore-forming agent is thus preferably chosen from products which have a tendency to sublime.

Depending upon the nature of the pore-forming agent utilized, it may also be necessary to employ a foaming agent. The particular foaming agents which are preferred comprise activated or non-activated azodicarbonamide, modified azodicarbonamide, 5 phenyl tetrazol and its derivatives, or aromatic derivatives of hydrazines, whose decomposition points are between about 200 and 390° C.

Preferably, the intimate mixture of pore-forming agent and foaming agent will have a granulometry of lower than about 200 microns, and preferably between about 50 and 100 microns.

The lubricating oil utilized in this invention preferably comprises a mixture of aliphatic hydrocarbons whose evaporation temperature is lower than the sublimation or the decomposition temperature of the pore-forming and foaming agents. The preferred proportions utilized include from about 30 to about 85% of the expandable P.T.F.E. compound, from about 10 to about 50% of the intimate mixture of pore-forming and foaming agents, and from about 5 to 20% of the lubricating oil.

In one process for producing these cables the mixture of components is prepared in a dry procedure. In a second embodiment which is preferred, the mixture is made in an aqueous dispersion, and most preferably by separate dispersion in a liquid of the expandable P.T.F.E. powder compound on the one hand, and of the pore-forming and foaming agents on the other. This is followed by mixing of the two separate dispersions, and then by evaporation of the liquid. The powder which is then obtained is lubricated with lubricating oil, with a view towards cold extrusion directly around the central conductor. Extrusion is then followed by evaporation and sintering.

Other characteristics and advantages of this invention will now become apparent from the following description of the coaxial cable which is made according to this invention, in accordance with the aqueous process.

By utilizing the aqueous dispersion process it is made possible to obtain grains whose dimensions are much smaller than those obtained by dry mixing, and also to increase the homogeneity and regularity of the insulating layer, which presents porosities on the order of about 1 micron. The principle involved consists of mixing with the expandable P.T.F.E. powder compound a product which sublimes or decomposes either before or during the sintering step, and which thus constitutes an unoccupied space whose volume is equal to or higher than that of the grains utilized.

The sublimation or decomposition temperature of the foaming agent utilized must be higher than that of the lubricating oil so that the expandable P.T.F.E. powder compound is already agglomerated during sublimation or decomposition.

The method of extrusion for the P.T.F.E. powder compound is conventional with, however, the need to use certain special equipment. As for the sintering step, because of the addition of a sublimating or decomposing product, it must be made in three different zones, i.e. in a special oven in order to obtain, successively, evaporation of the oils, sublimation or decomposition of the expansion product, and then sintering of the expandable P.T.F.E. powder compound.

The results which are obtained by using the expanded P.T.F.E. compound in order to make this coaxial cable now makes it possible to obtain, without great difficulty, dielectric constants of about 1.3 or less. The coaxial cables produced in accordance with this invention are primarily intended for use in fields where ultra high frequencies are utilized, such as radar, electronics and transmissions. The flexibility of this cable provides an advantage over rigid wave guides.

It will be understood that the embodiment described herein is merely exemplary and that a person skilled in the art may make many variations and modifications without departing from the spirit and scope of the invention. All such modifications and variations are intended to be included within the scope of the invention as defined in the appended claims.